US010848712B1

(12) United States Patent
Rao et al.

(10) Patent No.: US 10,848,712 B1
(45) Date of Patent: Nov. 24, 2020

(54) USER-DEFINED MEDIA SOURCE SYNCHRONIZATION

(71) Applicant: Amazon Technologies, Inc., Seattle, WA (US)

(72) Inventors: Siddhartha Shankara Rao, Seattle, WA (US); John Joseph Dunne, Bremerton, WA (US); Nathan Thomas, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/712,378

(22) Filed: Dec. 12, 2019

(51) Int. Cl.
*H04N 7/15* (2006.01)
*H04N 5/04* (2006.01)
*G06F 3/0484* (2013.01)
*H04N 7/14* (2006.01)

(52) U.S. Cl.
CPC ........... *H04N 7/15* (2013.01); *G06F 3/04847* (2013.01); *H04N 5/04* (2013.01); *H04N 7/147* (2013.01)

(58) Field of Classification Search
CPC .. H04N 7/15; H04N 7/14; H04N 5/04; H04N 21/242; H04N 21/4307; H04N 21/4104; G06F 3/0484

USPC ............................................ 348/14.01–14.16
See application file for complete search history.

(56) References Cited

U.S. PATENT DOCUMENTS

2012/0182988 A1\* 7/2012 Brenes .................... H04L 51/04
370/352
2018/0310048 A1\* 10/2018 Eber ..................... H04N 21/485

\* cited by examiner

*Primary Examiner* — Melur Ramakrishnaiah
(74) *Attorney, Agent, or Firm* — Lee & Hayes P.C.

(57) ABSTRACT

Within environments, such as audio-video environments, users may synchronize output of multiple media source(s). To synchronize the output of the media source(s), users may define setting(s) associated with outputting the media source(s) at one or more devices. For example, the user may delay or accelerate the output of audio and/or video sources. Interfaces presented on one or more of the devices may allow the user to change the settings. For environments including multiple users, each user may define setting(s) associated with each user to synchronize output of their associated media source(s). Recommendations may be provided to users, that when implemented, attempt to synchronize the media sources.

20 Claims, 8 Drawing Sheets

USER-DEFINED MEDIA SOURCE SYNCHRONIZATION

BACKGROUND

Business and individuals use audio and video conferencing to interact with one another, increase flexibility, and reduce travel time and costs. As part of this process, when joining an audio or video conference, participants have the choice of dialing in via multiple audio and video sources. For example, participants may utilize an electronic device (e.g., a mobile telephone, a laptop or desktop computer, a tablet computing device, etc.) for capturing audio and video. Captured audio and video data is then transmitted across a network to other participants within the conference. However, audio and video sources may not be synchronized or coordinated with one another, leading to poor user experiences. The lack of synchronized audio and video sources may also hinder efficient communications between the participants of the conference.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
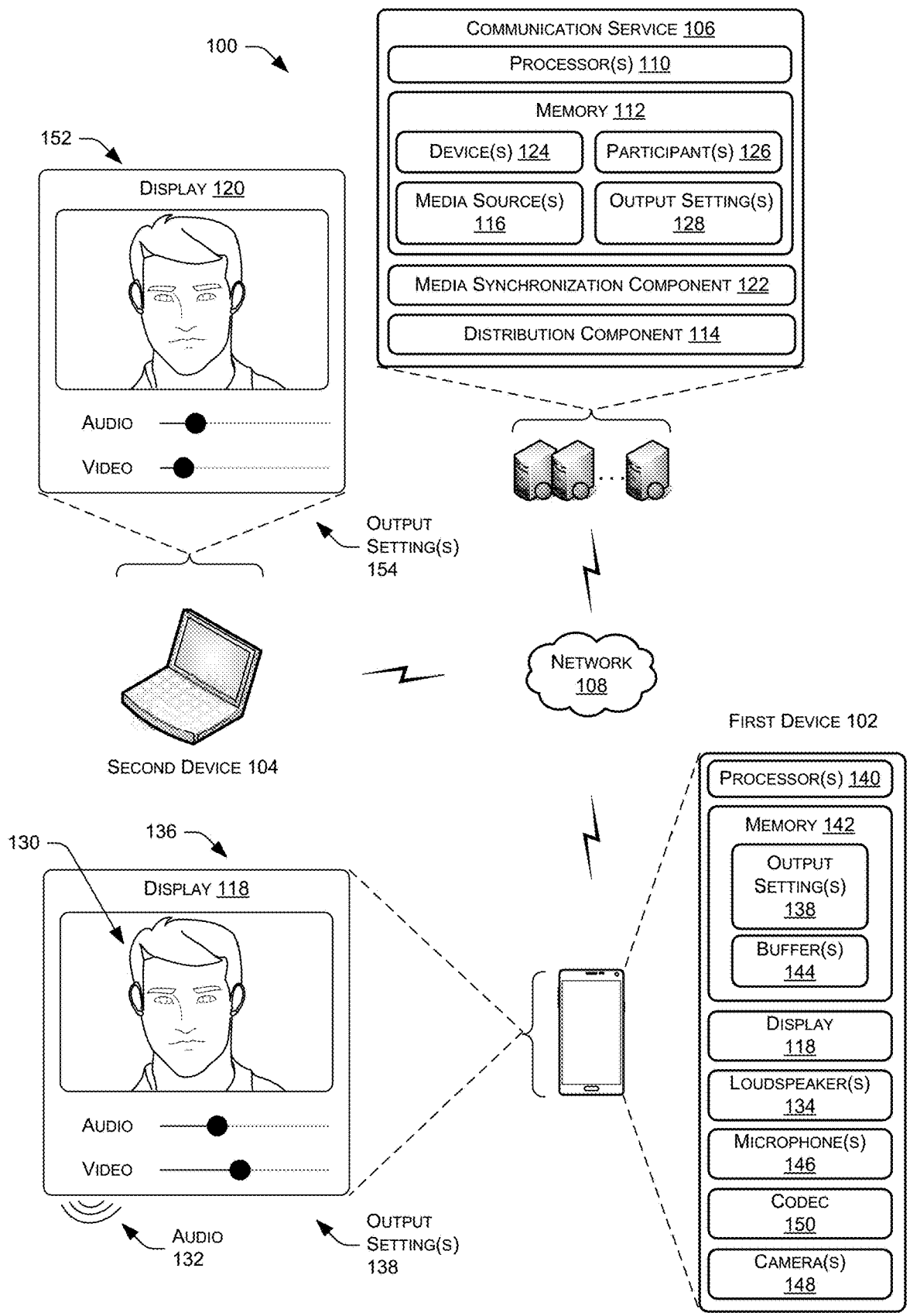
FIG. 1 illustrates an example environment for synchronizing the output of media source(s), showing that users may engage in a communication session via one or more devices. Using their respective devices, users may define output setting(s) for media source(s) associated with the other participants in the communication session. The setting(s) may serve to synchronize the output of the media source(s) of respective users.

This disclosure describes, in part, systems and methods for synchronizing output of multiple media sources to improve user experiences within audio and/or video environments. In some instances, the systems and methods may determine recommendations for synchronizing the media sources (e.g., audio data, video data, image data, etc.). These recommendations may then be sent to participants within audio and/or video environments. When instituted, the recommendations may attempt to synchronize the output of the media source(s) at the device(s) of the participants. Additionally, or alternatively, participants may utilize the device to input defined settings for synchronizing the multiple media sources. For example, participants may use an interface at the device that can cause a delay and/or accelerate the output of the individual media sources to better synchronize the media sources at the device. An interactive service or communication service hosting the audio and/or video environment may monitor the user-defined settings to provide improved recommendations in future audio and/or video environments. Accordingly, the synchronization of multiple media sources may improve user experiences within audio and/or video environments.

Initially, users may log into or otherwise join a communication session hosted by a communication service. In some instances, the communication session may include an audio and video environment, collaboration sessions, conference calls, video conferencing, online meetings, and so forth over which media sources are received, presented, and/or transmitted. For example, devices of participants of the communication session may include a microphone for capturing audio and a camera for capturing video. Devices may provide audio and/or video data (or other media source(s)) to the communication service and the communication service may redistribute the audio and/or the video (or the other media source(s)) to other participants of the communication session.

As part of this process, the communication service hosting the communication session may obtain information about the participants of the communication session. For example, the communication service may obtain information relating to identifiers of the participants (e.g., names, usernames, internet protocol (IP) address, etc.), a geographical location of the participants, a communication channel (or protocol) used to connect to the communication session or the communication service (e.g., Wi-Fi, Cellular, Bluetooth, etc.), a device type(s) operated by the participants (e.g., mobile phone, laptop, desktop computer, tablet, etc.), capabilities of the device (e.g., display, microphones, loudspeakers, etc.), and/or characteristics associated with each communication session of each participant (e.g., sharing screen, talking, recording, etc.). In some instances, the communication service may utilize this information to synchronize the media source(s) being output at the device(s) of the participants. For example, as each participant may be in a different environment and/or at a different location on a network, the transmission and reception of the media source(s) between the participants and/or to the communication service may vary. A participant may receive the media source(s) from a nearby participant, for example, at a faster rate than a participant more remotely located. Furthermore, in some instances, media source(s) may arrive at the devices of the participants at different times. For example, as video data is often larger in size than audio data, the video data may take a longer amount of time to travel or be redistributed by the communication service to the participants of the communication session. Additionally, or alternatively, in some instances, device(s) of the participants may receive audio data at a faster rate than video data. The communication channel may also affect the capacity at which the devices receive the media source(s). In some instances, there may be multiple media sources for a single participant. For example, a participant may be streaming video data produced by a camera on a laptop and audio data produced from a phone that the user has utilized to dial into a meeting. This can be especially troublesome from a synchronization standpoint because the audio data and video data are produced from distinct devices. These characteristics may impact the synchronization of the media source(s) being output at a participant's device.

The communication service may determine recommended output setting(s) of the media source(s), that when implemented, attempt to synchronize the media sources. For example, the recommended output setting(s) may include reducing a frame rate of video data being displayed to match audio data being output. In some instances, the recommended output setting(s) when implemented, may delay or speed up output of the media source(s) such that they are synchronized. For example, using buffer(s) (e.g., time delays), the device may align corresponding frames of video and audio by introducing offsets, delays, and so forth. In some instances, the communication service may determine a recommended output setting for each media source of each participant within the communication session. The communication service may transmit the recommended output setting(s) to the device of the participant. Upon receipt, the participant may choose to accept, reject, or modify the recommended output setting(s). For example, continuing with the above example, the display (or components of the device) may process the video data at a decreased frame rate, or otherwise delay the video data, to synchronize with the audio being output.

In some instances, the participant may use an interface of the device to modify output settings. For example, after or before accepting the recommended output setting(s) from the communication service, output of the media sources may not be synchronized and/or may be unacceptable to the participant. In some instances, the device of the participant, or the communication session operating on the device, may present an input area or field in which the participant may input settings to delay (e.g., slow down), accelerate (e.g., speed up), or otherwise modify the output of the media source(s) to synchronize with one another. In some instances, the field may include a scroll bar, buttons, numerical counters, graphical elements, icons, and so forth for receiving input from the participant. For example, a display may include a touch-sensitive interface and the participant may move an icon within a range of settings to adjust an output setting of the media source. In some instances, the display may present, for each media source, an icon to adjust the output setting. Based on this input, the device may institute the output setting(s) to delay (e.g., seconds, milliseconds, etc.) or accelerate (e.g., seconds, milliseconds, etc.) the output of the media sources, for example. In some instances, throughout a communication session, the participant may continually adjust the output setting(s) of the media sources depending on his or her preferences and based on changing characteristics of the participants of communications session (e.g., connection strength).

The adjustments or output setting(s) made by the participants may be transmitted to the communication service for use in updating future recommended output settings provided to the participants and/or other participants. For example, at a first instance, the communication service may recommend outputting video data at 40 frames per second, however, the participant may choose to output the video data at 30 frames per second to synchronize with audio data being output at the device. This setting, or adjustment, made by the participant may be transmitted to the communication service. Therein, at a second instance, rather than recommending output of the video data at 40 frames per second, the communication service may recommend outputting the video data at 30 frames per second. The communication service may therefore learn the settings instituted by the participants, or the settings adopted by the participants, for use in providing future recommended output setting(s).

Additionally, participants may share their respective output setting(s) amongst other participants in the communication session. The other participants may choose to accept another participant's settings or modify the settings. Additionally, or alternatively, the communication service may modify the output settings from one participant to another before transmitting the output settings. Such modification may account for a communication channel or device type of the other participants. For example, an indication may be sent to the communication service if a first participant increases a delay in the output of the video data (e.g. reduces the frame rate from 40 frames per second to 30 frames per second). Such delay may serve as an offset to align the media sources with one another. The communication service may then transmit the indication of the delay to a second participant, potentially recommending that the second participant apply the same delay to synchronize media source(s). Such notification may serve to notify other participants in the communication session that a participant is experiencing a lack of synchronization between media source(s) being output and has instituted one or more output settings. The other participants may therein choose to accept the settings, deny the settings, or modify the settings.

Each participant may be permitted to synchronize media sources for each respective participant in the communication session. For example, a device of a first participant may output video data associated with a second participant at a first delay, but output video data associated with a third participant at a second delay. In some instances, the first delay may synchronize with audio data associated with the second participant and the second delay may synchronize with audio data associated with the third participant. Participants may therefore be permitted to modify settings associated with the output of media sources that originate from each participant within the communication session. In other words, on a participant-by-participant basis, each participant may modify the timing of the output of the media sources associated with the other participants. The device of each participant may institute the output setting(s) as determined or selected by a participant operating the device. In such instances, the communication service may separately transmit the media source(s) (or data) from each participant such that the device of a particular participant may output the media source(s) according to the determined output setting(s) for each participant, and for each media source.

In some instances, the communication service may link or otherwise associate multiple devices with a participant. For example, a participant may join a communication session via a first device (e.g., phone) and via a second device (e.g., laptop computer). Using either the first device and/or the second device, the participant may modify settings associated with outputting the media sources. However, knowing that the first device and the second device are associated with the same participant may be used by the communication service when distributing the output setting(s) between participants. Associating the first device and the second device with the participant may be used by the communication service when transmitting the media sources to the first device and the second device, respectively. For example, the communication service may transmit audio data to the phone and may transmit the video data to the laptop computer. In such instances, the participant may input a setting to delay output of the video data at the second device and associate this change with the participant.

Accordingly, in light of the above, the systems and methods herein may synchronize media sources, such as audio and video data, to produce enhanced audio and/or video conferencing experiences. For example, the systems and methods herein may recommend output settings and/or participants may define his or her own output setting(s) for outputting the media sources. Such settings may attempt to alleviate instances where the video and audio of a participant are not synchronized, such as in instances where a mouth movement does not match speech. The devices may output the media sources at the defined settings to reduce a latency between the media sources being output. Additionally, although the systems and methods are described herein for use in a communication session, the systems and methods may be extended to other audio and/or video environments to synchronize the output of media sources. For example, in streaming environments, a computing device may receive audio and video data from a streaming service. In some instances, a user of the computing device may update output settings to synchronize the audio and video being output. Additionally, or alternatively, in virtual workspace environments (e.g., virtual desktop applications) or other interactive environments (e.g., gaming applications), users may adjust output settings to synchronize multiple media sources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein.

FIG. 1 illustrates an example environment 100 for synchronizing multiple media sources. As shown, the environment 100 may include a first device 102, a second device 104, and a communication service 106. In some instances, the first device 102 may be associated with a first user and the second device 104 may be associated with a second user. The communication service 106 may provide, host, or establish a communication session within which the first user and the second user interface or otherwise interact with one another via the first device 102 and the second device 104, respectively. For example, the first user and the second user may utilize the communication session to share media sources, such as audio and/or video, or other content (e.g., presentations, images, etc.).

As shown, FIG. 1 illustrates that the first device 102, the second device 104, and the communication service 106 may communicatively couple over a network 108 via wired technologies (e.g., wires, USB, fiber optic cable, etc.), wireless technologies (e.g., RF, cellular, satellite, Bluetooth, etc.), or other connection technologies. The network 108 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The first device 102, the second device 104, and the communication service 106 may connect to the network 108 using one or more network interfaces, respectively. Additionally, although FIG. 1 illustrates two devices connecting to the communication service 106, or engaged in the communication session, more than two devices (or two users) may engage in the communication session.

The communication service 106 may be implemented as one or more servers and may, in some instances, form a portion of a network-accessible computing service implemented as a computing infrastructure of processors, storage, software, data access, and so forth that is maintained and accessible via a network such as the Internet. The communication service 106 may include components to establish the communication session for multiple devices, such as the first device 102 and the second device 104. For example, as illustrated, the communication service 106 may include processor(s) 110 and memory 112. The processor(s) 110 may perform one or more processes and/or functions associated with establishing the communication session and connecting users within the communication session. For example, the communication service 106 may include a distribution component 114 for distributing media source(s) (or content) amongst participants of the communication session, such as the first device 102 and the second device 104.

The memory 112 may store media source(s) 116. In some instances, the media source(s) 116 may include content (e.g., images, presentations, slides, animations, etc.) presented during the communication session. The media source(s) 116 may also include audio and/or video being output on the devices of the communication session and/or audio and/or video being captured by devices of the communication session. For example, during a communication session, one or more participant(s) may display content to other participant (s) of the communication session (e.g., screen sharing). The distribution component 114 may receive media source(s) from participant(s) for redistribution to other participant(s) of the communication session. For example, FIG. 1 further illustrates that the first device 102 may include a display 118 and the second device 104 may include a display 120. The display 118 and the display 120 may output video, images, or other content to the participant(s) within the communication session. Here, media source(s) displayed, or presented by one participant, may be stored as media source(s) 116 within the memory and then redistributed to other participant(s) via the distribution component 114. In some instances, the display 118 and/or the display 120 may include a touch-sensitive display (e.g., capacitance, resistive, etc.) for receiving touch input for adjusting the output setting(s) of the media source(s), as discussed herein.

In some instances, the communication service 106 hosting the communication session may utilize information about the participants for synchronizing media source(s) output at the device(s). For example, participant(s) of the communication session may be in different environments, different locations on the network 108, and/or may connect to the communication service 106 (or the communication session) using different devices and/or different connection types. Such factors may, in some instances, impact the synchronization of the media source(s) output on the device(s) of the participant(s). For example, the transmission and receipt of the audio data and/or the video data between the participants may vary. A first participant using the first device, for example, may output or consume media source(s) from a nearby second participant at a faster rate than a third participant more remotely located. Media source(s) may also arrive at the devices at different times, or in multiple packets. For example, as video data is often larger in size than audio data, the video data may take a longer amount of time to travel or be redistributed by the communication service 106 to participants of the communication session.

To synchronize the output of media source(s) at the devices, the communication service 106 may include a media synchronization component 122 that provides recommended output setting(s) to the participant(s) of the communication session. In some instances, the media synchronization component 122 may utilize characteristics of the device(s) of the participant(s) and/or other characteristics associated with the participant(s). For example, as illustrated, the memory 112 may store or otherwise have access to device(s) 124, participant(s) 126, and/or output setting(s) 128. The device(s) 124 may include characteristics associated the device(s) within the communication session, such as the first device 102 and the second device 104. In some instances, the characteristics may include a device type (e.g., phone, laptop, desktop computer, tablet, conferencing unit, etc.), capabilities of the device (e.g., content-sharing, microphone(s), loudspeaker(s), camera, processing power, graphics card, etc.), a connection between the device and the communication service 106 (or the communication session) and/or the network 108 (e.g., RF, Wi-Fi, Cellular, strength, etc.). The participant(s) 126 may include information associated with the participant(s) of the communication session, or the user(s) operating the device(s), respectively. For example, the participant(s) 126 may include identifiers of the user (e.g., names, IP address, location, etc.). In some instances, the participant(s) 126 may be stored in association with the device(s) 124 to associate the device(s) 124 with the participant(s) 126.

The output setting(s) 128 may include information associated with outputting media source(s) at the first device 102 and the second device 104 (or other device(s) in the communication session). In some instances, the media synchronization component 122 may determine the output setting(s) 128. For instance, depending on the media source(s) 116, the device(s) 124, and/or the participant(s) 126, the first device 102 and the second device 104 may output the media source(s) at different rates to synchronize the media source(s). As an example, a connection between the first device 102 and the communication service 106 may include a slower connection (e.g., Cellular) as compared to a connection (e.g., direct LAN) between the second device 104 and the communication service 106. The first device 102, for example, may be a mobile phone connected to the communication service 106 via a cell tower, which may introduce latencies in transmitting data to the communication service 106 and receiving data from the communication service 106. As a result, in some instances, media source(s) may be received by devices within the communication session at different rates or intervals.

The media synchronization component 122 may therefore utilize the various databases stored in the memory 112 for providing recommended output setting(s) 128 to the participant(s) of the communication session. The recommended output setting(s) 128 may include, in some instances, delaying (e.g., slowing down) or accelerating (e.g., speeding up) output of the media source(s) 116 at the device(s) 124 to synchronize output of the media source(s). For example, the recommended output setting(s) 128 may include applying a delay to video data (e.g., by adjusting a frame rate of the video data) being output via a display of the device or delaying the output of audio data by a certain time (e.g., 200 milliseconds, 1 second, etc.). In some instances, the recommended output setting(s) 128 may include outputting video data at a specified frame rate and outputting audio data at a specified frame rate. Such frame rates, respectively, may align corresponding video and audio data. In some instances, the recommended output setting(s) 128 may be considered offsets at which the media source(s) are to output to align. The communication service 106 may then transmit the recommended output settings to the device(s) within the communication session via the network 108. The recommended setting(s) when instituted by the first device 102, for example, may cause the media source(s) to synchronize. For example, the first device 102 may delay a rendering of the video data on the display 118 to synchronize with the audio data (or other media source(s)), or vice versa.

To further illustrate, the first device 102 may include a first type of device (e.g., mobile phone) and the second device 104 may include a second type of device (e.g., laptop computer). Additionally, or alternatively, the first device 102 may connect to the communication session via a first connection type or network (e.g., Cellular), while the second device 104 may connect to the communication session via a second connection type or network. Noted above, these characteristics may impact the rate at which the first device 102 and the second device 104 receive data from and transmit data to the communication service 106. Such characteristics may be stored in the memory 112 of the communication service 106 for use by the media synchronization component 122 to synchronize the media source(s) at the first device 102 and the second device 104. In analyzing these characteristics, the media synchronization component 122 may determine the output setting(s) 128 for the first device 102 and/or the second device 104. Upon providing the recommended output setting(s) to the first device 102 and/or the second device 104, participants (or users of the first device 102 and the second device 104) may respectively accept or reject the recommended output setting(s) 128. If the participant chooses to accept the recommend output setting(s) 128, or implement the recommend output setting(s) 128, the associated device may implement the setting(s), for example, by outputting the video data at a specified frame rate. For example, the first device 102 may output content 130 on the display 118 to synchronize with audio 132 being output by loudspeaker(s) 134 of the first device 102.

Additionally, or alternatively, the participant(s) of the communication session may provide participant-defined setting(s) using a user interface of the device(s). For example, before or after receiving the recommended output setting(s) from the communication service 106, the participant(s) may interact with their respective devices to modify the output setting(s). FIG. 1 illustrates that the first device 102 may include a user interface 136 for adjusting output setting(s) 138, such as audio and video. In some instances, the participant may interface with the user interface 136 for adjusting the output setting(s) 138. For example, the display 118 of the first device 102 may include a graphical element or a slider bar for adjusting the output setting(s) 138 associated with the audio and/or the video. As shown, the audio and the video (or other media sources) may include a respective slider bar for adjusting their respective output setting 138. Noted above, the display 118 may include a touch-sensitive interface and the first participant may touch and drag an icon of the audio slider bar and/or an icon of the video slider bar to adjust the output setting(s) 138. For example, the first participant may move the icon to increase or decrease a rate at which the first device 102 outputs the audio and the video, respectively.

The location of the icon the slider bars, respectively, may indicate the current output settings 138 within a range of output settings for the audio and the video (or other media sources). As an example, the first participant may provide input on the video slider bar to move the icon to the left to slow display of the video. Upon receiving this indication, the first device 102 may determine the location of the icon, associate the location with an output setting(s) of the video, and may output the video at the decreased rate (e.g., frame rate).

FIG. 1 illustrates that the first device 102 may include processor(s) 140 and memory 142, which may store or otherwise have access to the output setting(s) 138 (or the recommended output setting(s) 128 from the communication service 106) and/or buffer(s) 144. The processor(s) 140 may perform one or more processes and/or functions associated with collaborating within the communication session. The output setting(s) 138 may include the output setting(s) 138 for the media sources. Such output setting(s) may be used by the processor(s) 140 when outputting the media sources at the specified setting(s). The processor(s) 140 may cause the display 118 and the loudspeaker(s) 134 to output video data and audio data according to the output setting(s) 138 (or the recommended output setting(s) 128). In some instances, the memory 142 may include the buffer(s) 144 for delaying the output of the media source(s). For example, the first device 102 may receive the media source(s) 116 from the communication service 106 and may store the media source(s) 116 in the buffer(s) 144 for outputting at a later instance in time according to the output setting(s) 138 (or the recommended output setting(s) 128).

The first device 102 includes microphone(s) 146 to receive audio input, such as voice input, for transmitting to the communication service 106. The communication service 106 may then store audio data associated with the voice input in the media source(s) 116, and may redistribute to the audio data to the other participants or devices within the communication session. Additionally, camera(s) 148 of the first device 102 may capture images or record videos of the first participant operating the first device 102 for transmitting to the communication service 106 and redistribution to the other participants or devices within the communication session. A codec 150 is further provided and coupled to the loudspeaker(s) 134 and the microphone(s) 146 to encode and/or decode the audio signals. The codec 150 may convert audio data between analog and digital formats.

In some instances, upon receiving input from the first participant adjusting the output setting(s) 138 at the first device 102, the first device 102 may transmit the output setting(s) 138 to the communication service 106. The communication service 106 may therein update the output setting(s) 128 or store the output setting(s) 138 in the output setting(s) 128. At later instances, the communication service 106 may therein utilize the output setting(s) 128, or the updated setting(s) when providing recommended output setting(s) to the participant(s) of the communication session.

Additionally, the communication service 106 may forward the output setting(s) 138 to other participant(s) within the communication session. For example, if the first participant inputs output setting(s) 138 at the first device 102, or changes the output setting(s) 138, the first device 102 may transmit the output setting(s) 138 to the communication service 106 for forwarding onto the second device 104 (or other devices within the communication session). The output setting(s), or an indication thereof, may inform the other participants of the updated output setting(s) and/or that a particular participant within the communication session is experiencing a lack of synchronization between media sources being output. In some instances, the other participants may choose to adopt the output setting(s) at his or her respective device to alleviate potential synchronization. In some instances, the communication service 106 may modify the output setting(s) from one participant before transmitting to another participant to account for characteristics of the device of the other participant or the connection between the device and the communication service 106, for instance.

The second device 104 may include similar components as the first device 102 for capturing media sources, outputting media sources, and adjusting output setting(s) of the media sources. For example, the second device 104 may display a user interface 152 having graphical elements for adjusting output setting(s) 154 of media source(s) on the second device 104.

Furthermore, as discussed above, although FIG. 1 illustrates the communication session between two participants, the communication session, or the communication service 106, may support a greater number of participants and/or devices. In such instances, the displays of the first device 102 and the second device 104 (and other devices connected to the communication session) may display graphics and output setting(s) associated with each participant in the communication session. For example, the first device 102 may display an image or a video stream of the second participant and an image or video stream of the third participant. The display 118 may also display output setting(s) associated with the second participant and output setting(s) associated with the third participant. The first participant may adjust, for each participant, the output setting(s) associated with the media source(s) of each participant. The first participant may therefore adjust the output setting(s) on a participant-by-participant basis and each of the devices may operate independently to control the output of the media source(s) at the respective devices.

Although FIG. 1 illustrates a particular method of adjusting the output setting(s) of the media source(s), the first device 102 and/or the second device 104 may include other mechanisms or interfaces to adjust the output setting(s). For example, the display 118 of the first device 102 and/or the display 120 of the second device 104 may display buttons, counters, scales, wheels, and so forth to permit the participant to provide touch or mechanical input to adjust the output setting(s). Additionally, or alternatively, the output setting(s) may include more than two setting(s), or more than two media source(s) may be output for the participant(s). The first device 102 and/or the second device 104 may include a slider bar for each media source(s) and the participant(s) may adjust the output setting for each media source on an individualized or independent basis.

As used herein, a processor, such as processor(s) 110 and/or the processor(s) 140 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 112 and/or the memory 142 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
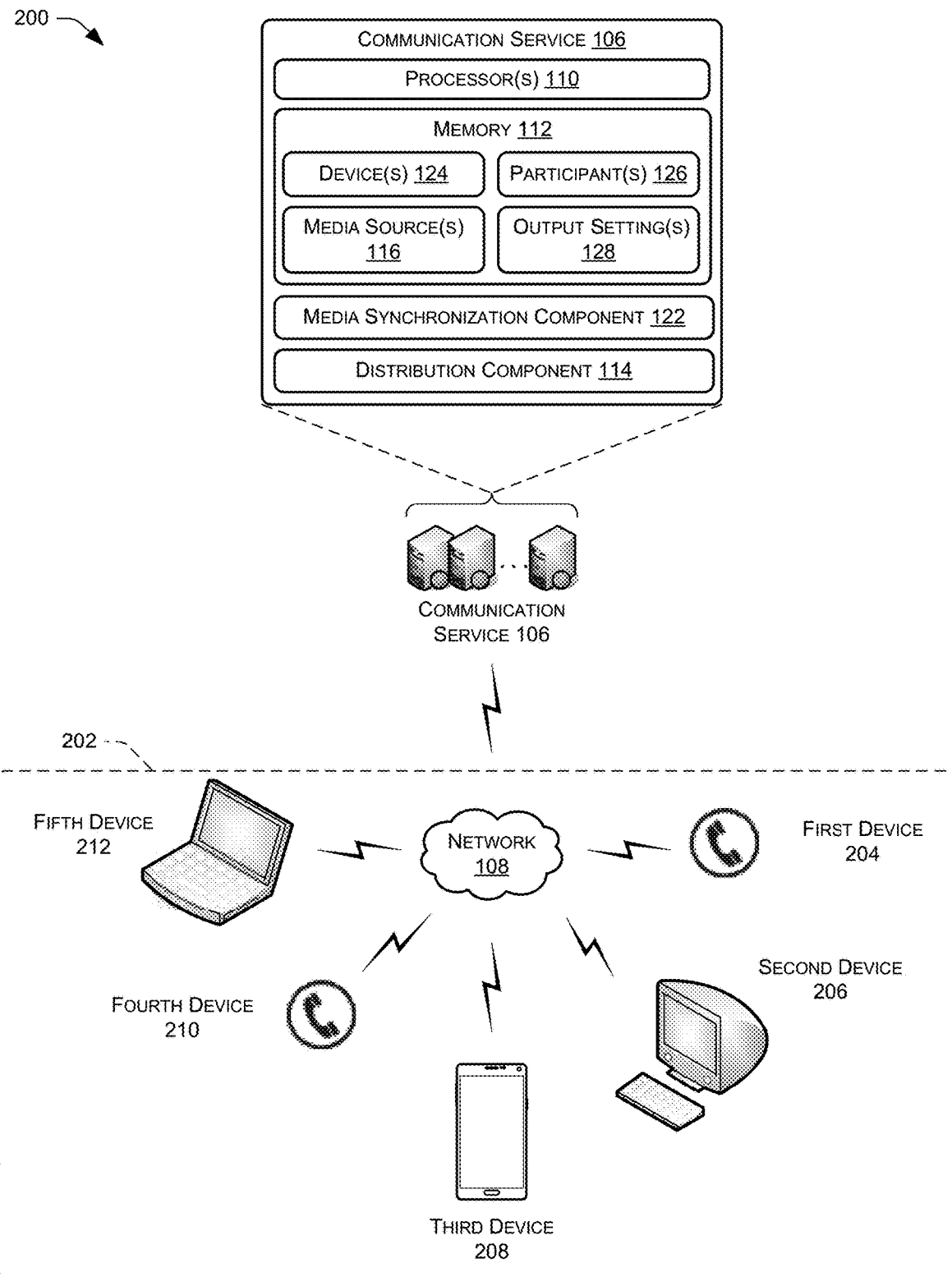
FIG. 2 illustrates an example environment for synchronizing the output of media source(s) from participants engaged in a communication session.

FIG. 2 illustrates an example environment 200 hosting a communication session 202 for participants engaged in the communication session 202. As discussed above, a communication service 106 may include components for hosting the communication session 202, such as a distribution component 114 and/or a media synchronization component 122. Additionally, memory 112 of the communication service 106 may store or otherwise have access to database(s) for facilitating the synchronization of media source(s) output at the device(s) of the participant, such as output setting(s) 128, participant(s) 126, and/or device(s) 124.

As shown in FIG. 2, the communication session 202 may include a first device 204, a second device 206, a third device 208, a fourth device 210, and/or a fifth device 212. Each of the participants may interact, interface, or engage within the communication session 202 via the devices. For example, a first participant may utilize the first device 204 (e.g., landline, mobile, etc.), a second participant may utilize the second device 206 (e.g., a desktop computer), a third participant may utilize the third device 208 (e.g., a mobile device, tablet, phone, etc.), a fourth participant may utilize the fourth device 210 (e.g., phone, landline, mobile, etc.), and a fifth participant may utilize the fifth device 212 (e.g., a laptop computer). However, although the environment 200 or the communication session 202 is shown including a certain number of participants, or the participants utilizing particular devices, the communication session 202 may include more than or less than five participants and/or the participants may utilize different devices than shown.

In some instances, the distribution component 114 may transmit media source(s) to each of the devices at the same rate. However, as noted above, the receipt of the media source(s) by the devices within the communication session 202 may vary depending on the connection between the devices and/or the communication service 106. Therefore, at each device, participants may modify output setting(s) to synchronize the media source(s).

Each of the devices within the communication session 202 may include capabilities for outputting one or more media source(s). For example, some of the devices may include output components for multiple media source(s), while other devices may include limited capabilities and may output a single media source. For instance, a landline phone may include capabilities for capturing audio data and outputting audio data, but may not include a display for outputting image data and/or video data. In such instances, the communication service 106 may determine the capabilities of the device(s), for example, using the device(s) 124 database, and the distribution component 114 may accordingly transmit the media source(s) to the device(s). For example, in the event that the device includes a landline phone, the distribution component 114 may not transmit video data.

Additionally, or alternatively, in some instances, a participant may utilize more than one device for engaging in a communication session. For example, a participant may dial-in to the communication session 202 with a first device and may join the communication session 202 on another device. The first device may, for example, capture and output a first media source, such as audio data, while the second device may capture and output a second media source, such as video data. In this sense, the participant may engage within the communication session 202 using more than one device, each of which may capture and transmit a respective media source. In such instances, the communication service 106 may associate multiple devices with a particular participant. Such association may be utilized by the communication service 106 to determine output setting(s) or which device(s) (i.e., participants) are instituting the output setting(s) for synchronizing the media source(s) 116. As used herein, output setting(s) may include setting(s) at which the devices are configured to utilize when outputting (e.g., displaying, presenting, etc.) the media source(s) (e.g., video data, image data, audio data, etc.). In instances where devices include multiple output components (e.g., display, loudspeaker, lighting elements, etc.), the output components may output the respective media sources at their defined output settings. The communication service 106 may relay or recommend similar output setting(s) to additional participants in the communication session 202.

For example, the first device 204 and the second device 206 may be associated with a common participant. This participant may, for instance, call into the communication session 202 via the first device 204 to capture, receive, and/or transmit audio data, and may join the communication session 202 via the second device 206 to capture, receive, and/or transmit video data. Here, the participant may respectively use the first device 204 and the second device 206 for their respective media source capabilities. The communication service 106 may associate the first device 204 and the second device 206 with the participant. In some instances, the first device 204 and the second device 204 may be associated via the user directly associating the device (e.g., within the communication session 202) or embedding metadata within the connections of the user. In doing so, the first device 204 and the second device 206 may synchronize to output media source(s). In other words, knowing that the device(s) are associated with a common participant may allow for the device(s) to synchronize the media source(s). For example, the first device 204 and the second device 206 may communicatively couple to one another (either directly or indirectly) to synchronize the output of the media source(s). In some instances, the first device 204 and/or the second device 206 may include a user interface, or other fields, whereby the participant may adjust the output setting(s) of the media source(s). For example, the participant may provide input to the second device 206 indicating a delay (e.g., an adjustment of a frame rate) for video data displayed on the second device 206. Such adjustment may serve to align a frame of video being output with an associated frame of audio being output. This output setting may then be communicated to the communication service 106. However, the participant may also adjust the output setting(s) using physical or mechanical buttons on the devices (e.g., push, rotatable knobs, etc.), a remote control associated with the devices, and/or other interfaces capable of receiving touch or mechanical input from the user.

The communication service 106 may then associate this output setting with the participant, in addition to the output setting of the first device 204. Knowing the output settings of the participant using the first device 204 and the second device 206, or associating the devices, the communication service 106 may transmit recommended output setting(s) or an indication of the output settings of the participant with other participants in the communication session 202.

In some instances, the communication service 106 may associate the first device 204 and the second device 206 (or other device(s)) utilizing identifier(s) of the device(s) (e.g., IP address, phone number, etc.), identifiers of the participant (e.g., name, username, etc.), and so forth. Additionally, or alternatively, the communication service 106 may receive explicit indications from the participant identifying or confirming the device(s) which they use to interface within the communication session 202. Such associations and identifier(s) may be stored in the memory 112 of the communication service (e.g., the device(s) 124 and/or the participant(s) 126) for use in later instances to associate devices to a common participant.

Figure 3:
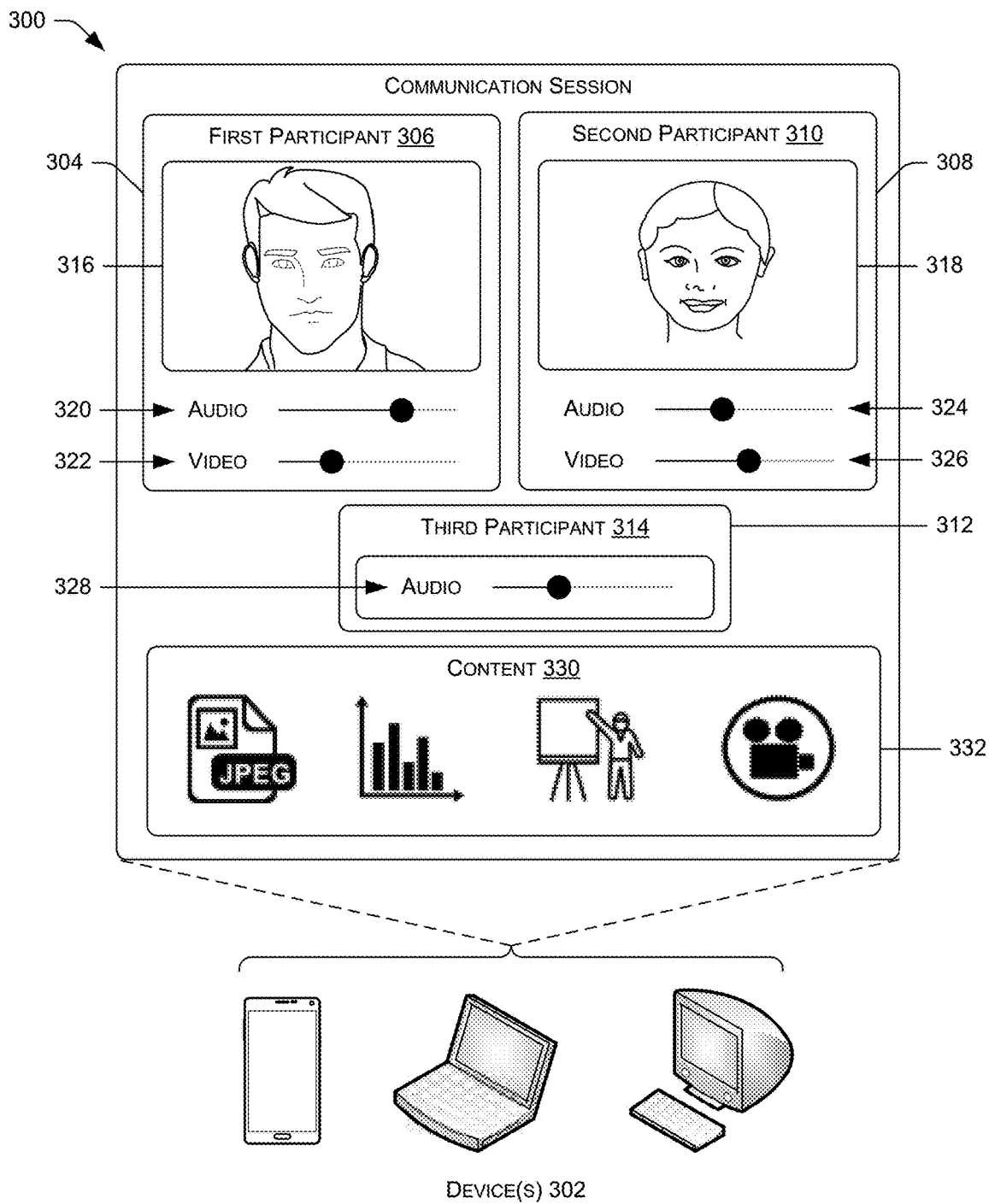
FIG. 3 illustrates an example display of a device engaged in a communication session, showing example interfaces a participant may utilize to synchronize the output of media source(s).

FIG. 3 illustrates an example display 300 of a participant within a communication session. The display 300 may comprise a component of a device 302 configured to display interfaces or content presented during the communication session. The device 302 may also be configured to output various media source(s) of the communication session, or associated with other participants of the communication session.

For example, the display 300 illustrates a first interface 304 associated with a first participant 306, a second interface 308 associated with a second participant 310, and a third interface 312 associated with a third participant 314. The first interface 304 may include an area 316 for displaying an image or video data associated with the first participant 306. For example, the area 316 may display video data captured by a device of the first participant 306 and which is received at the device 302 from a communication service 106 hosting the communication session. The device 302 may continuously receive the video data from the communication service 106 for updating the video displayed to present the participant of the device 302 with a live feed or stream of the first participant 306.

Similarly, the second interface 308 may include an area 318 for displaying an image or video data associated with the second participant 310. For example, the area 318 may display video data captured by a device of the second participant 310 and which is received at the device 302 from the communication service 106. The device 302 may continuously receive the video data from the communication service 106 for updating the video data displayed to present the participant of the device 302 with a live feed or stream of the second participant 310.

The device 302 may additionally, or alternatively, receive audio data associated with the first participant 306 and/or the second participant 310. For example, the device of the first participant 306 may capture audio data via a microphone and transmit the audio data to the communication service 106 for forwarding to the device 302. The device 302 may output the audio data via loudspeaker(s).

In some instances, depending on the capabilities of the device associated with the participants, or the capabilities of the device the participants utilize, the display 300 may display corresponding content in the interfaces. For example, the device of the third participant 314 may not include a camera for capturing video data and/or the third participant 314 may not enable the camera for sharing video data captured by the camera. However, the device of the third participant 314 may include a microphone for capturing audio of the third participant.

The first interface 304, the second interface 308, and/or the third interface 312 may include controls for adjusting output setting(s) of the media sources, such as audio and video. For example, the first interface 304, the second interface 308, and/or the third interface 312 illustrate a slidable icon that the user (or participant) of the device 302 may utilize to adjust for output setting(s). As shown, the first interface 304, the second interface 308, and the third interface 312 may include a corresponding icon for each media source of the participants that is output by the device 302. That is, the first interface 304 may include an icon 320 for adjusting the output setting of the audio and an icon 322 for adjusting the output setting of the video. To adjust an output setting of the audio, for instance, the user of the device 302 may provide touch input to or at the icon 320 and drag the icon 320 to the left or right within a predetermined range or range of setting(s) associated with outputting the audio data (e.g., speed). Moving the icon 320 may, for example, cause the device 302 to delay output of the audio associated with the first participant 306. Upon selecting or otherwise determining a setting, the user may remove his or her finger and the setting may be implemented on the device 302. The user may similarly adjust the icon 320 for altering output of video (e.g., slow down, speed up, etc.), such as a frame rate at which this display 300 renders the video of the first participant 306. Accordingly, the device 302 may include a touch-sensitive display for adjusting the output setting(s) at the device 302.

The second interface 308 may similarly include an icon 324 for adjusting the audio of the second participant 310 and an icon 326 for adjusting the video of the second participant 310. The third interface 312 may include an icon 328 for adjusting the audio of the third participant 314. Accordingly, the interfaces on the display 300 may display icons for each media source associated with each participant. Using these icons, the user of the device 302 may adjust output setting(s) of each participant on an individualized basis. To permit output of the media source according to the setting(s), in some instances, the device 302 may receive decoupled audio data and/or video data from the communication service 106. Receiving decoupled audio data of the first participant 306, audio data of the second participant 310, and/or audio data of the third participant 314 may permit the device 302 to apply the respective output setting(s) when outputting the audio data of the first participant 306, the second participant 310, and/or the third participant 314. For example, the device 302 may buffer the audio data of the first participant 306 by 300 milliseconds to synchronize with video data of the first participant 306, but may delay audio data of the second participant 308 by 100 milliseconds to synchronize with video data of the second participant.

Although the first interface 304, the second interface 308, and/or the third interface 312 illustrate a particular method for adjusting output setting(s) of the media source(s), the first interface 304, the second interface 308, and/or the third interface 312 may include alternate methods. For example, the first interface 304, the second interface 308, and/or the third interface 312 may include buttons (e.g., "+" and "−"), drop-down menus, scales, or other interfaces that may receive input from the user for adjusting the output settings.

The display 300 further illustrates that content 330 may be shared during the communication session. For example, one or more of the participants of the communication session may share the content 330, such as presentations, videos, images, charts, and so forth. In some instances, the content 330 may be presented in a specified area 332. Additionally, or alternatively, the content 330 may be presented in the area 316 or the area 318, depending on which participant presents the content. For example, if the first participant 306 displays content or shares his or her screen, as compared to a video stream of his or her camera, the content may be presented in the area 316 and in lieu of the image or feed of the first participant 306.

In some instances, the user of the device 302 may be permitted to modify an output setting of the content 330. For example, if the first participant 306 is presenting a slideshow and narrating the slideshow, the device 302 may output data associated with the slideshow and data associated with audio of the first participant 306. However, if the user of the device 302 is experiencing a lack of synchronization between the slideshow and the audio being output, the user may adjust a delay of the video (e.g., reduce a frame rate) to match an output of the audio. Such reduction delay may align frames of the slideshow with frames or corresponding outputs of the audio.

Additionally, the device 302 may include components to capture media source(s) of the participant and transmit the media source(s) to the first participant 306, the second participant 310, and the third participant 314. For example, a microphone of the device 302 may capture speech and transmit audio data associated with the speech to the communication service 106 for forwarding or transmission to the device(s) of the of the first participant 306, the second participant 310, and the third participant 314.

Figure 4:
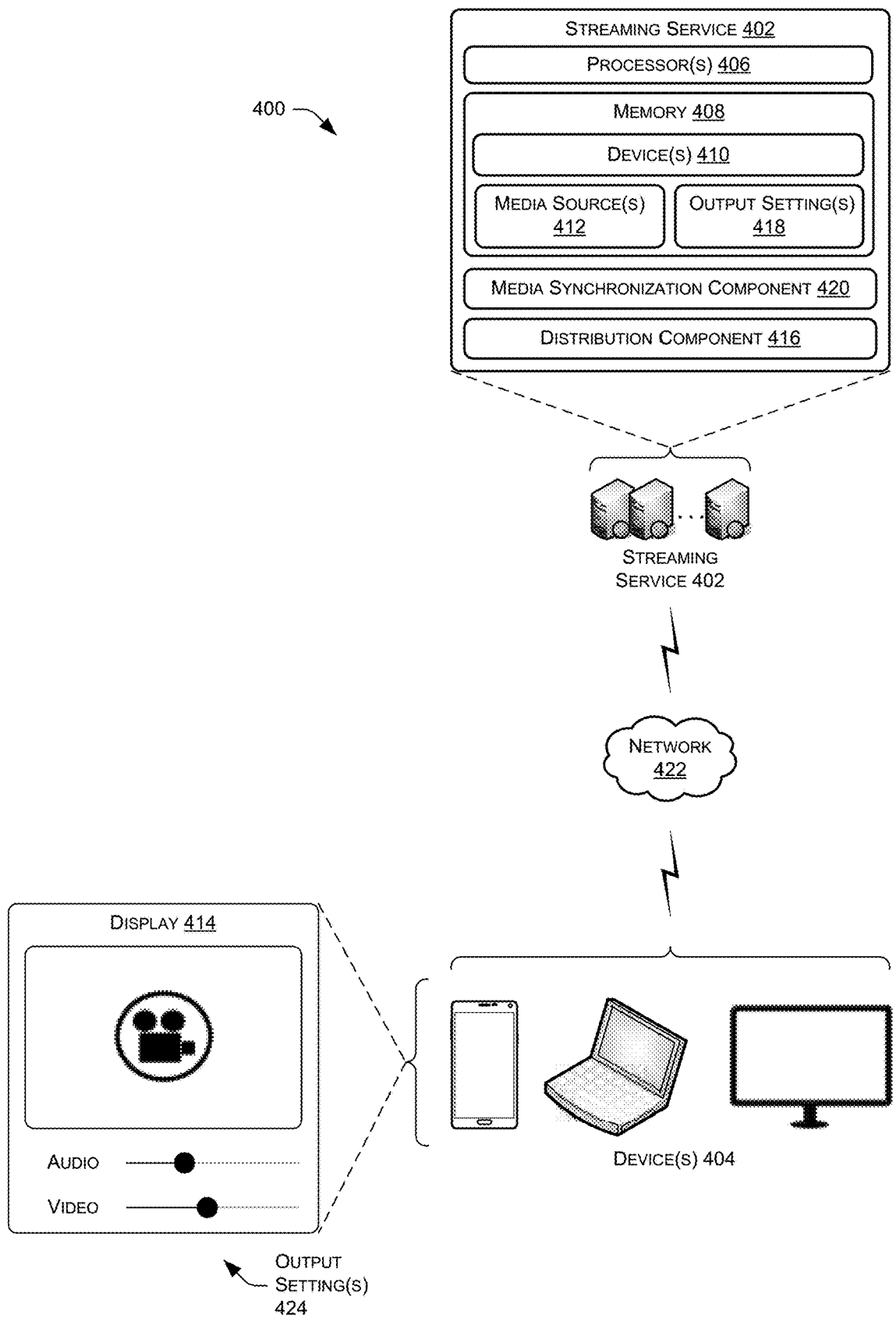
FIG. 4 illustrates an example environment for synchronizing the output of media source(s) from a streaming service.

FIG. 4 illustrates an example environment 400 for streaming media source(s) from a streaming service 402 to a device 404. In some instances, the streaming service 402 may include similar components, and functionality, as the communication service 106. For example, the streaming service 402 may include processor(s) 406 and memory 408. The memory 408 may store, or otherwise have access to device(s) 410, which may be similar to the device(s) 124. Additionally, the memory 408 may store other otherwise have access to media source(s) 412, such as videos, music, and/or other content. The streaming service 402 may provide media source(s) stored in the media source(s) 412 to the device 404 for output on one or more output components of the device 404, such as a display 414. However, the device 404 may include also include other output components as well (e.g., haptic actuators, loudspeakers, lighting elements, etc.). In some instances, a distribution component 416 of the streaming service 402 may provide the media source(s) to the device 404 along with output setting(s) 418. A media synchronization component 420 of the streaming service 402 may determine the output setting(s) 418 for synchronizing the media source(s).

As discussed above, the output setting(s) 418 may function to synchronize the output of the media source(s) at the device 404. For example, a user of the device 404 may stream a video on the device 404. The device 404 may receive, from the streaming service 402, media source(s) for output on the display 414 and loudspeakers. For example, the device 404 may receive video data for output on the display 414 and audio data for output via the loudspeakers. However, in some instances, the device 404 may receive the video data at a slower rate than the audio data due to characteristics of a connection between the device 404 and the streaming service 402, via a network 422. Other characteristics may also impact streaming the media source(s) at the device 404 that may lead to a lack synchronization between devices of users participating in a conference or communication session.

To resolve a lack of synchronization between devices of users participating in a conference or communication session, the display 414 may present output setting(s) 424 associated with the media source(s). In some instances, the output setting(s) 424 may be adjusted via the user providing input to the display 414 (e.g., touch-sensitive display). Additionally, or alternatively, the user may adjust the output setting(s) 424 via a remote control, for example, of a television. Regardless, the user may adjust output setting(s) of the media source(s) to synchronize audio and video being output at the device 404.

Moreover, although FIG. 4 or the display 414 illustrates a single item content being shown (e.g., a movie), the display 414 may present more than one content item. For example, the display 414 may correspond to a workspace that includes multiple areas for displaying or presenting content. Here, the user may individually or independently control the output of the media source(s) associated with each content item.

FIGS. 5-8 illustrate various processes related to synchronizing media source(s). The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1-4, although the processes may be implemented in a wide variety of other environments, architectures, and systems.

Figure 5:
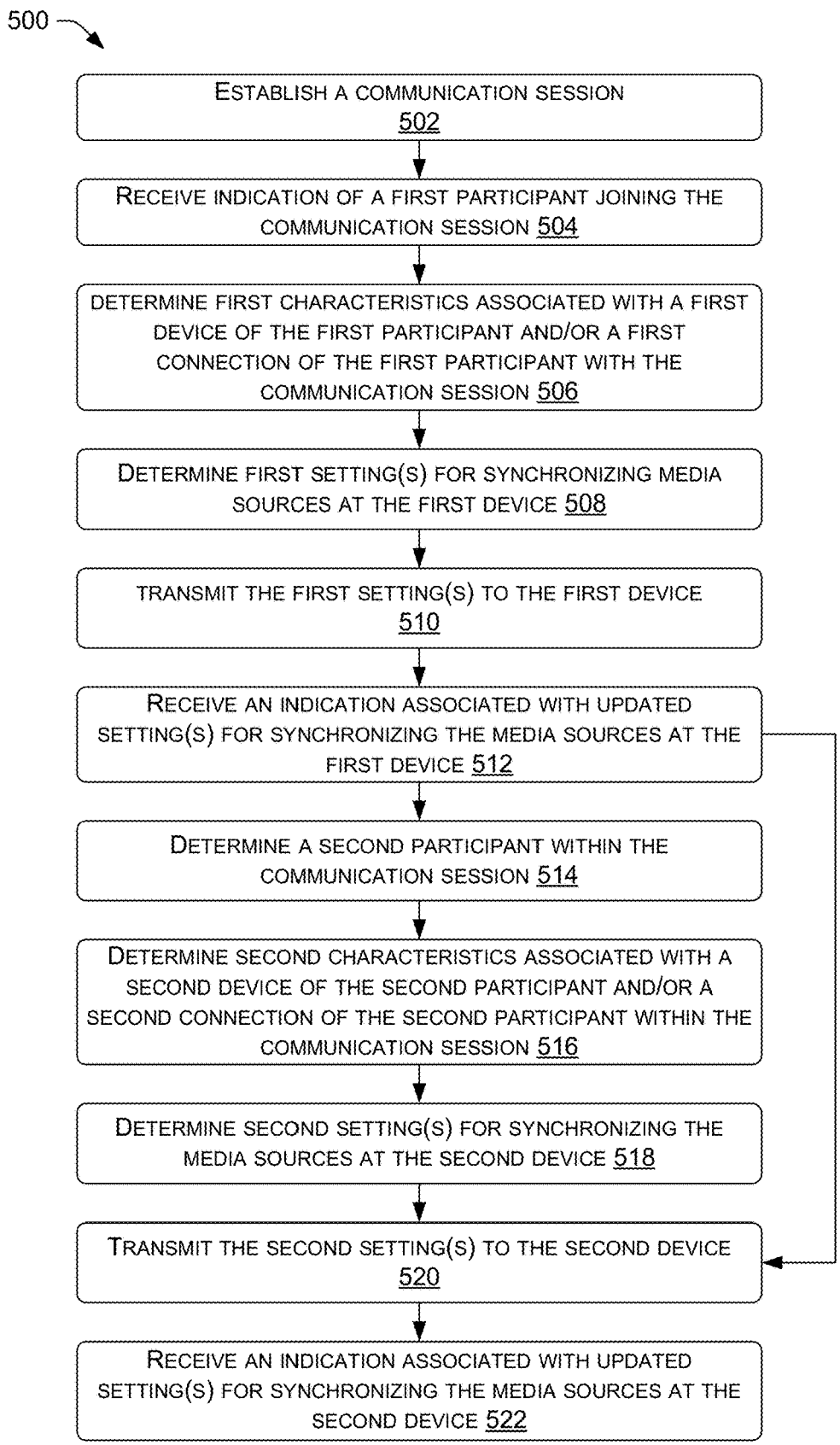
FIG. 5 illustrates an example process for synchronizing the output of media source(s) at a device and providing setting(s) for synchronizing the output of media source(s).

FIG. 5 illustrates an example process 500 for synchronizing media source(s) at devices. In some instances, the process 500 may be performed by a communication service 106 for synchronizing media source(s) output on devices.

At 502, the process 500 may establish a communication session. For example, the communication service 106 may establish a communication session in which participants are able to interact and interface with one another via one or more media sources (e.g., audio, video, presentations, etc.).

At 504, the process 500 may receive an indication of a first participant joining the communication session. For example, a first participant may log into or otherwise join the communication session using a device associated with the first participant, where the device may be personal to the participant (e.g., a mobile telephone, a laptop computer, etc.) or may be otherwise associated with the participant (e.g., conferencing devices located at an employer of the participant).

At 506, the process 500 may determine first characteristics associated with a first device and/or a first connection of the first participant within the communication session. For example, the communication service 106 may determine a type of connection of the first participant with the communication session (e.g., Cellular). Additionally, the communication service 106 may determine a device type (e.g., mobile phone) and/or capabilities of the first device (e.g., camera(s), microphone(s), etc.). In some instances, the communication service 106 may determine the first characteristics via accessing memory 112 of the communication service 106. Additionally, or alternatively, the communication service 106 may receive the first characteristics from the first device of the first participant. For example, the first device may transmit an indication of the device type and/or the type of connection.

At 508, the process 500 may determine first settings for synchronizing media source(s) at the first device. For example, the communication service 106, or components of the communication service 106, such as a media synchronization component 122, may determine the setting(s) for synchronizing media source(s) at the first device. In some instances, the communication service 106 may utilize the first characteristics for determining the setting(s). For example, based at least in part on the device type or the type of connection, the communication service 106 may determine that the first participant may experience a lack synchronization between media sources being output at the first device. The setting(s) may serve to synchronize the media sources when output on the first device. For example, the settings may include delaying an output of audio data of a second participant in the communication session by 100 milliseconds to synchronize with video data of the second participant. In some instances, the communication service 106 may utilize previously used setting(s) when determining the setting(s) at 508.

At 510, the process 500 may transmit the first setting(s) to the first participant. For example, the communication service 106 may transmit the first setting(s) to the first device. Therein, the first participant may choose to accept or implement the setting(s).

At 512, the process 500 may receive an indication associated with updated setting(s) for synchronizing media sources at the first device. For example, the first participant using the first device may input participant-defined setting(s) associated with outputting the media source(s). In some instances, the first participant may utilize a user interface of the first device, such as a scroll bar, graphical element, or other field, for defining the setting(s). Upon selecting the updated setting(s), the first device may transmit the updated setting(s) to the communication service 106. The communication service 106 may utilize the updated setting(s) to update the output setting(s) 128 of the communication service 106. In future instances, the communication service 106 may utilize the updated setting(s), or an average of the setting(s), for providing to the first participant. For example, the communication service 106 may receive an indication that the first participant chose to delay output of the audio data by 200 milliseconds. Accordingly, the communication service 106 overtime may attempt to accurate predict or recommend setting(s) for outputting media source(s) at the first device.

At 514, the process 500 may determine a second participant within (or joining) the communication session. For example, the second participant may log into or otherwise join the communication session using a device associated with the second participant and the communication service 106 may receive an indication of the second participant joining the communication session.

At 516, the process 500 may determine second characteristics associated with a second device and/or a second connection of the second participant within the communication session. For example, the communication service 106 may determine a type of connection of the second participant with the communication session (e.g., Wi-Fi). Additionally, the communication service 106 may determine a device type (e.g., laptop) and/or capabilities of the second device (e.g., camera(s), microphone(s), etc.). In some instances, the communication service 106 may determine the second characteristics via accessing the memory 112 of the communication service 106. Additionally, or alternatively, the communication service 106 may receive the second characteristics from the second device. For example, the second device may transmit the device type and/or the type of connection.

At 518, the process 500 may determine second settings for synchronizing media source(s) at the second device. For example, the communication service 106, or components of the communication service 106, such as the media synchronization component 122, may determine the setting(s) for synchronizing media source(s) at the second device. In some instances, the communication service 106 may utilize the second characteristics for determining the setting(s). For example, based at least in part on the device type or the type of connection, the communication service 106 may determine that the second participant may experience a lack of synchronization between media source(s) being output at the second device. Additionally, or alternatively, in some instances the setting(s) may be based at least in part on the setting(s) determined at 508 and/or the updated setting(s) received at 512. Furthermore, in some instances, the communication service 106 may utilize previously used setting(s) when determining the setting(s) at 518. The setting(s) may therefore serve to synchronize the media sources at the second device.

At 520, the process 500 may transmit the second setting(s) to the second participant. For example, the communication service 106 may transmit the second setting(s) to the second device. Therein, the second participant may choose to accept or implement the setting(s), or may reject the setting(s).

Additionally, as shown, in some instances, from 512 the process may transmit the setting(s) or the updated setting(s) of the first device to the second device. The second device may therein institute or implement the setting(s) or the updated setting(s).

At 522, the process 500 may receive an indication associated with updated setting(s) for synchronizing media sources at the second device. For example, the second participant using the second device may input participant-defined setting(s) associated with outputting the media source(s). In some instances, the second participant may utilize a user interface of the second device, such as a scroll bar, graphical element, or other field, for defining the setting(s). Upon selecting the updated setting(s), the second device may transmit the updated setting(s) to the communication service 106. The communication service 106 may utilize the updated setting(s) to update the output setting(s) 128 of the communication service 106. In future instances, the communication service 106 may utilize the updated setting(s), or an average of the setting(s), for providing to the second participant.

Figure 6:
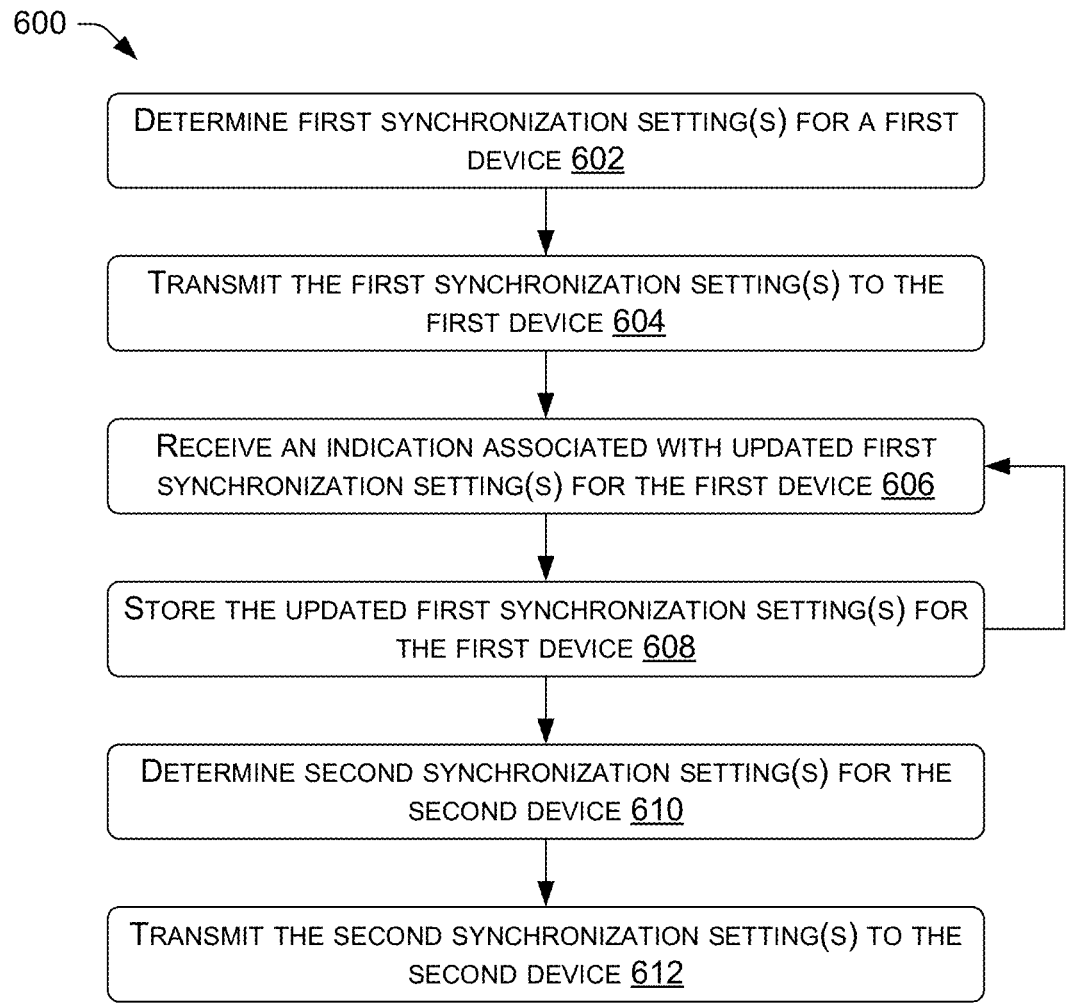
FIG. 6 illustrates an example process for synchronizing the output of media source(s) at a device and providing setting(s) for synchronizing the output of media source(s).

FIG. 6 illustrates an example process 600 for synchronizing media source(s) output on devices. In some instances, the process 600 may be performed by a communication service 106.

At 602, the process 600 may determine first synchronization setting(s) for a first device within a communication session. In some instances, the first synchronization setting(s) may correspond to setting(s) at which the first device is to output media sources (e.g., audio, video, etc.). For example, the setting(s) may identify a delay, frame rate, or offset at which to output video data at the first device to synchronize with audio data.

At 604, the process 600 may transmit the first synchronization setting(s) to the first device. The first device may implement the first synchronization setting(s) for outputting the media sources at the first device.

At 606, the process 600 may receive an indication associated with updated first synchronization setting(s) for the first device. For example, after transmitting the first synchronization setting(s), the communication service 106 may receive updated first synchronization setting(s) that correspond to participant-defined synchronization setting(s). In some instances, the participant may utilize a scroll bar or other field to generate, or define, the participant-defined synchronization setting(s).

At 608, the process 600 may store the updated first synchronization setting(s) in association with the first device. For example, knowing the updated first synchronization setting(s) may be used to update the synchronization setting(s) stored in association with the first device. Such updating may be used when generating synchronization setting(s) in future instances or communication sessions. For example, the communication service 106 may maintain a log or history of synchronization setting(s) for the first device. In some instances, the synchronization setting(s) for the first device may include an average synchronization settings (e.g., frame rate, audio buffer, etc.) implemented by the first device (or a participant associated with the first device).

From 608, the process 600 may loop to 606 whereby the process 600 may receive updated synchronization setting(s). For example, depending on the connection between the first device and the communication session, the participant using the first device may constantly adjust the synchronization setting(s) and the communication service 106 may receive the updated synchronization setting(s) for use in storing the synchronization setting(s) in association with the first device. Accordingly, the process 600 may continuously update or store the synchronization setting(s) for future uses and based on the user input at the first device.

At 610, the process 600 may determine second synchronization setting(s) for a second device within the communication session. In some instances, the second synchronization setting(s) may correspond to setting(s) at which the second device is to output media sources (e.g., audio, video, etc.). For example, the setting(s) may identify a frame rate at which to output video data at the second device to align the video data with corresponding audio data. In some instances, the synchronization setting(s) for the second device may be based at least in part on the synchronization setting(s) of the first device.

At 612, the process 600 may transmit the second synchronization setting(s) to the second device. The second device may implement the second synchronization setting(s) for outputting the media sources at the second device.

Figure 7:
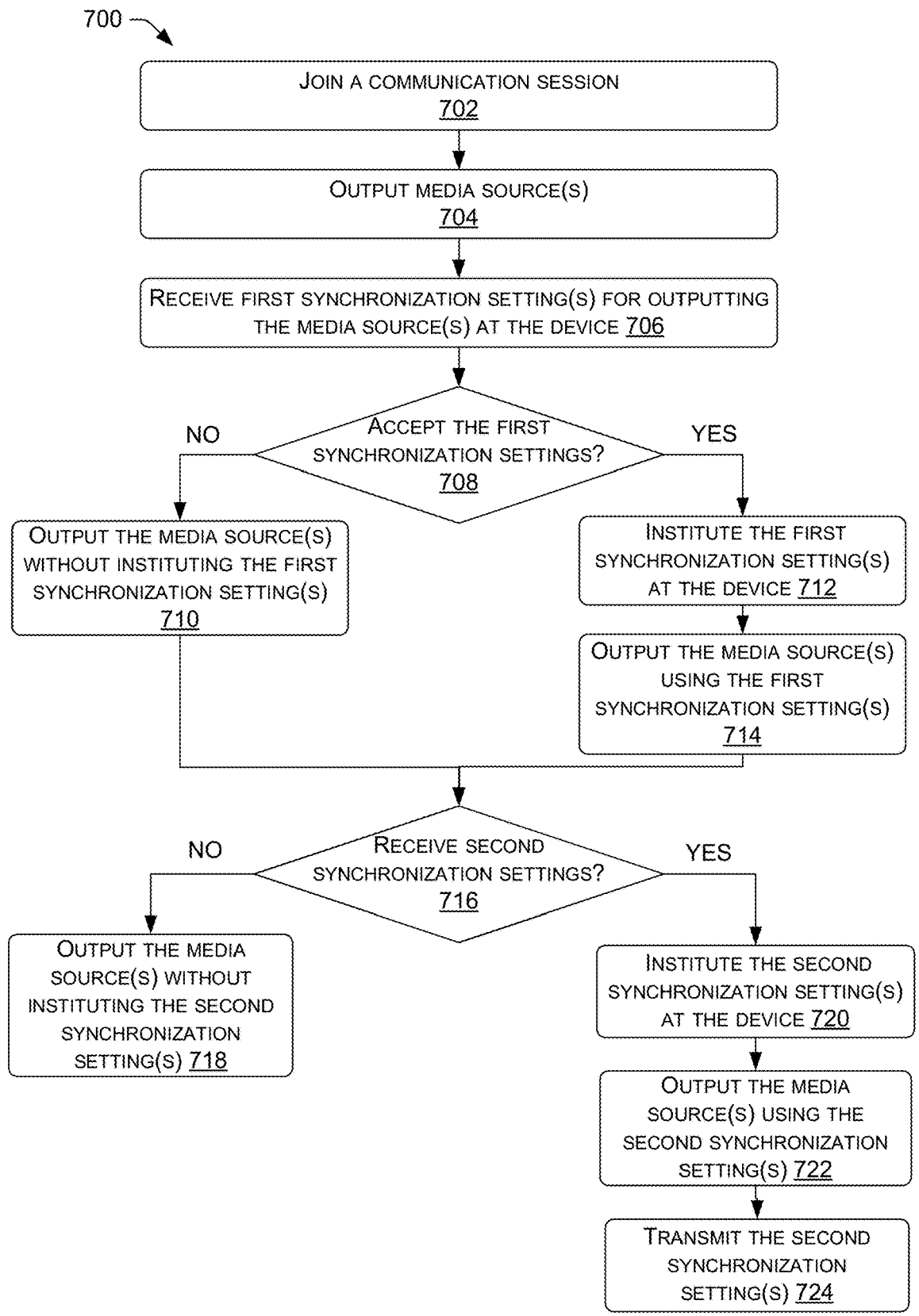
FIG. 7 illustrates an example process for receiving setting(s) and synchronizing the output of media source(s) at a device of a participant engaged in a communication session.

FIG. 7 illustrates an example process 700 for synchronizing media source(s) output on devices. In some instances, the process 700 may be performed by a device within a communication session, such as a first device 102 or a second device 104.

At 702, the process 700 may join a communication session. For example, a device may join a communication session hosted by a communication service 106. The communication service may distribute media sources (e.g., audio, video, etc.) to devices, or participants, within the communication session.

At 704, the process 700 may output media sources. For example, the device may output a video on a display of the device and/or may output audio via a loudspeaker of the device.

At 706, the process 700 may receive first synchronization setting(s) for outputting the media source(s) at the device. For example, the device may receive, from the communication service 106, a setting associated with outputting the video and/or a setting associated with outputting the audio. In some instances, the setting(s) may be determined by the communication service 106 based at least in part on a type of the device, historical setting(s) of the device (or a participant using the device), a connection between the device and the communication service 106, etc. When implemented, the first synchronization setting(s) may attempt, or serve, to synchronize the video and audio being output at the device.

At 708, the process 700 may determine whether the first synchronization setting(s) were accepted. For example, a user of the device, or a participant using the device within the communication session, may either reject the first symbolization setting(s) or accept the first synchronization setting(s). If at 708, the process 700 declines or does not accept the first synchronization setting(s), the process 700 may following the "NO" route and continue to 710.

At 710, the process 700 may output the media source(s) without instituting the first synchronization setting(s). For example, the device may output the video on the display and/or the audio via the loudspeaker(s) using default rates or default setting(s).

Alternatively, if at 708 the process 700 accepts the first synchronization setting(s), the process 700 may follow the "YES" route and continue to 712. At 712, the process 700 may institute the first synchronization setting(s). In some instances, instituting the first synchronization setting(s) may involve the device configuring or otherwise outputting the media source(s) according to the first synchronization setting(s). For example, processor(s) of the device may cause the media source(s) to output at a certain rate (e.g., delay, accelerated, etc.)

Accordingly, at 714, the process 700 may output the media source(s) at the first synchronization setting(s). For example, the device may display videos at a specified frame rate according to the first synchronization setting(s). Additionally, or alternatively, the device may delay output of audio data to loudspeaker(s) to synchronize the audio data with video data being output by the display.

From 714, the process 700 may continue to 716, whereby the process 700 may determine if second synchronization setting(s) are received. For example, a participant using the device may utilize a scroll bar of a user interface for adjusting the synchronization setting(s) of the media source(s) being output at the device. The user may, for example, delay output of the audio data to synchronize with video data being output by the display. Alternatively, the participant may reduce a frame rate of the display (e.g., slow down or delay the device outputting the audio). The second synchronization setting(s) may correspond to participant-defined setting(s) for outputting the media sources(s). In some instances, the second synchronization setting(s) may be received from the communication service 106 hosting the communication session. In such instances, the second synchronization setting(s) may represent recommended output setting(s) that when implemented align the media source(s) and/or may represent or be associated with output setting(s) of another participant in the communication session adjusting his or her output setting(s).

At 716, if the process 700 determines that second synchronization setting(s) were not received, the process 700 may follow the "NO" route and proceed to 718. At 718, the process 700 may output the media source(s) without instituting the second synchronization setting(s). For example, the device may output the video on the display and/or the audio via the loudspeaker(s) using default rates or default setting(s).

Alternatively, if at 716 the process 700 receives the second synchronization setting(s), the process 700 may follow the "YES" route and continue to 720. At 720, the process 700 may institute the second synchronization setting(s). In some instances, instituting the second synchronization setting(s) may involve the device configuring or otherwise outputting the media source(s) according to the second synchronization setting(s).

Accordingly, at 722, the process 700 may output the media source(s) using the second synchronization setting(s). For example, the device may display videos at a specified frame rate according to the second synchronization setting(s). Additionally, or alternatively, the device may delay output of audio data to loudspeaker(s) to synchronize the audio data with video data being output by the display.

At 724, the process 700 may transmit the second synchronization setting(s). For example, the device may transmit the second synchronization setting(s) to the communication service 106 for updating a database associated with the setting(s) of the device. Additionally, or alternatively, after receiving the second synchronization setting(s), the communication service 106 may transmit the second synchronization setting(s), or other synchronization setting(s), to additional participants within the communication sessions.

Figure 8:
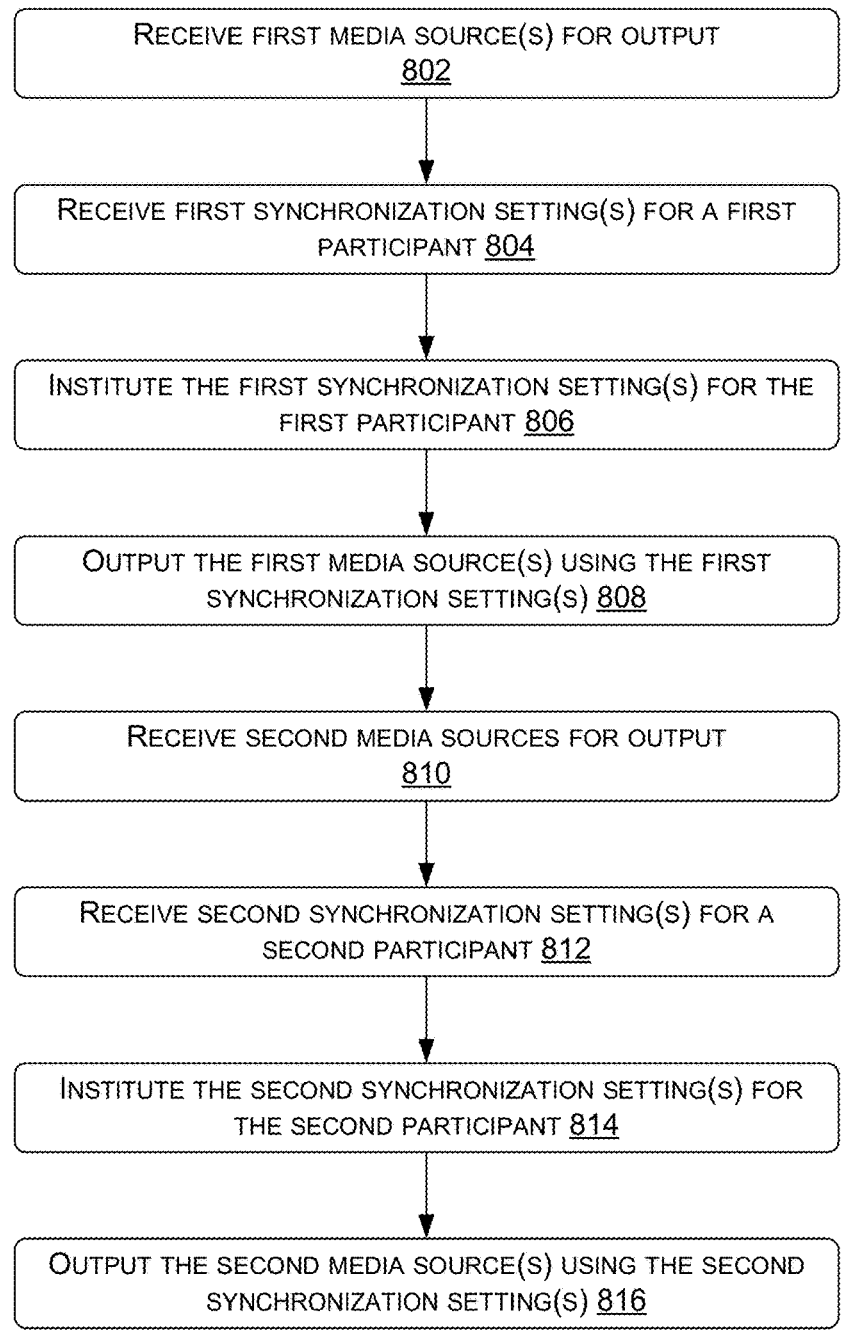
FIG. 8 illustrates an example process for receiving setting(s) and synchronizing the output of media source(s) at a device of a participant engaged in a communication session.

FIG. 8 illustrates an example process 800 for synchronizing media source(s) output on devices. In some instances, the process 800 may be performed by a device within a communication session, such as a first device 102 or a second device 104.

At 802, the process 800 may receive first media source(s) for output on a device. For example, the device may receive audio data for output on loudspeaker(s) of the device and/or video data for output on a display on the device. In some instances, the first media source(s) may be associated with a first participant in the communication session (e.g., audio and/or video data of the first participant).

At 804, the process 800 may receive first synchronization setting(s) for the first participant. For example, a participant or user of the device may modify output setting(s) of the first media source(s), respectively. In some instances, the user of the device may interact with a user interface of the device to change the output setting(s) of the first media source(s). The user may move a first icon on the user interface to modify output of the audio (within a range of settings) and/or may move a second icon on the user interface to modify output of the video (within a range of settings) associated with the first participant. For example, the settings may include delaying either the output of the audio to the loudspeaker(s) or the video to the display to synchronize the audio and video being output.

At 806, the process 800 may institute the first synchronization setting(s). For example, processor(s) of the device may configure the components of the device to output the first media source(s) at their respective setting(s) (i.e., delays, frame rates, etc.). Accordingly, at 808 the device may output the first media source(s) using the first synchronization setting(s).

At 810, the process 800 may receive second media source(s) for output on a device. For example, the device may receive audio data for output on loudspeaker(s) of the device and/or video data for output on a display on the device. In some instances, the second media source(s) may be associated with a second participant in the communication session.

At 812, the process 800 may receive second synchronization setting(s) for the second participant. For example, a participant or user of the device may modify output setting(s) of the second media source(s), respectively. In some instances, the user of the device may interact with the user interface of the device to change the output setting(s) of the second media source(s). The user may move a first icon on the user interface to modify output of the audio and/or may move a second icon on the user interface to modify output of the video associated with the second participant. For example, the settings may include accelerating (e.g., speed up) output of the audio via the loudspeaker(s) or increasing a frame rate of the video on the display to synchronize the audio and video being output (e.g., speeding up display).

At 814, the process 800 may institute the second synchronization setting(s). For example, processor(s) of the device may configure the components of the device to output the second media source(s) at their respective setting(s) (i.e., accelerated rate, frame rates, etc.). Accordingly, at 816 the device may output the second media source(s) using the second synchronization setting(s).

The process 800 illustrates an example scenario where a participant of a communication session may receive media sources from at least two additional participants within the communication session (e.g., the first participant and the second participant). The participant is provided the ability to define, on a participant-by-participant basis, the synchronization setting(s). In other words, the participant is able to customize the output setting(s) for each participant in the communication to synchronize the media source(s) associated with each participant. In such instances, the device may receive the media source(s) from the communication service hosting the communication session and may output the media source(s) based on their respective participant-defined or recommended setting(s).

In some instances, the communication service may transmit the media source(s) decoupled from one another such that the device may output the respective media sources at their respective setting(s). For example, the device may receive first audio data associated with audio of the first participant and may receive second audio data associated with audio of the second participant. Continuing with the example of the process 800, the device may store the first audio data in one or more buffer(s) to synchronize the audio with the video data being displayed at the decreased frame rate, and may accelerate the output of the second audio data to synchronize the audio with the video data being displayed at the increased frame rate. Accordingly, the participant may modify the setting(s) to cause the first media source(s) and the second media source(s) to independently be synchronized for output on the device.

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more non-transitory computer-readable media storing computer-executable instructions that, when executed by the one or more processors, cause the one or more processors to perform acts comprising:
receiving first audio data and first video data associated with a first participant of a communication session;
transmitting, to one or more devices of a second participant of the communication session, the first audio data and the first video data for output;
determining a first synchronization setting for the one or more devices of the second participant, the first synchronization setting synchronizing a first output of the first video data with a second output of the first audio data;
transmitting, to the one or more devices of the second participant, the first synchronization setting;
receiving second audio data and second video data associated with the second participant of the communication session;
transmitting, to one or more devices of a first participant, the second audio data and the second video data for output;
determining a second synchronization setting for the one or more devices of the first participant, the second synchronization setting synchronizing a third output of the second video data with a fourth output of the second audio data;
transmitting, to the one or more devices of the first participant, the second synchronization setting;
causing a first graphical element to be presented on the one or more devices of the second participant, the first graphical element being associated with the first output of the first video data;
causing a second graphical element to be presented on the one or more devices of the second participant, the second graphical element being associated with the second output of the first audio data; and
receiving a third synchronization setting from the one or more devices of the second participant, the third synchronization setting representing an input received at the one or more devices of the second participant, the third synchronization setting synchronizing the first output of the first video data with the second output of the first audio data at the one or more devices of the second participant.

2. The system of claim 1, wherein:
the first graphical element includes a first icon, a first location of the first icon on the first graphical element corresponding to the first synchronization setting;
the second graphical element includes a second icon, a second location of the second icon on the second graphical element corresponding to the first synchronization setting; and
the acts further comprise receiving, from the one or more devices of the second participant, input data representing a movement of the first icon from the first location on the first graphical element to a third location on the first graphical element, the third location corresponding to the third synchronization setting.

3. The system of claim 1, the acts further comprising transmitting, based at least in part on receiving the third synchronization setting, a fourth synchronization setting to a third device associated with a third participant of the communication session, wherein the fourth synchronization setting is based at least in part on at least one of:
a device type of the third user device; or
a connection between the third user device and the system.

4. The system of claim 1, wherein determining the first synchronization setting for the one or more devices of the second participant is based at least in part on at least one of:
a device type of the one or more devices of the second participant;
a connection between the one or more devices of second participant and the system;
one or more capabilities of the one or more devices of the second participant; or
one or more previous synchronization settings for the one or more devices of the second participant.

5. A method comprising:
receiving first media data associated with a first participant of a communication session;
receiving second media data associated with the first participant of the communication session;
determining a first setting corresponding to a first output of the first media data, the first setting associated with synchronizing the first output the first media data and a second output of the second media data at a device of a second participant of the communication session;
transmitting the first media data, the second media data, and the first setting to the device;
causing a first graphical element to be presented on the device for altering the first output of the first media data;
causing a second graphical element to be presented on the device for altering the second output of the second media data; and
receiving input data representing a second setting associated with altering the first output of the first media data to synchronize the first output of the first media data and the second output of the second media data, the input data based on input received, via the device, from the second participant.

6. The method of claim 5, further comprising receiving additional input data representing a third setting associated with altering the second output of the second media data.

7. The method of claim 5, wherein:
the first media data corresponds to video data;
the second media data corresponds to audio data;
the first setting comprises a first frame rate; and
the second setting comprises a second frame rate that is different than the first frame rate.

8. The method of claim 5, further comprising transmitting, based at least in part on receiving the input data, data to an additional device, the data associated with synchronizing third media data output at the additional device.

9. The method of claim 5, wherein the first graphical element includes a first icon associated with the first output of the first media data, a first location of the first icon on the first graphical element corresponding to the second setting within a range of settings associated with the first output of the first media data, the input data comprises first input data, further comprising receiving second input data representing a movement of the first icon from the first location on the first graphical element to a second location on the first graphical element, the second location corresponding to a third setting at which to output the first media data.

10. The method of claim 9, wherein the second graphical element includes a second icon associated with the second output of the second media data, a third location of the second icon on the second graphical element corresponding to a fourth setting within a second range of settings associated with the second output of the second media data, further comprising receiving third input data representing a second movement of the second icon from the third location on the second graphical element to a fourth location on the second graphical element, the second location corresponding to a fifth setting at which to output the second media data.

11. The method of claim 5, further comprising:
receiving third media data associated with a third participant of the communication session;
receiving fourth media data associated with the third participant of the communication session;
determining a third setting corresponding to a third output of the third media data, the third setting associated with synchronizing the first output the first media data and a fourth output of the fourth media data at the device; and
transmitting the third media data, the fourth media data, and the third setting to the device.

12. The method of claim 5, wherein the first setting corresponding to the first output of the first media data is based at least in part on at least one of a device type of the device, capabilities of the device, or a connection between the device and a computing device hosting the communication session, further comprising determining a third setting associated with altering the first output of the first media data to synchronize the first output of the first media data and the second output of the second media data based at least in part on the at least one of the device type, the capabilities of the device, or the connection between the device and the computing device.

13. A system comprising:
one or more processors; and
one or more non-transitory computer-readable media storing computer-executable instructions that, when executed by the one or more processors, cause the one or more processors to perform acts comprising:
receiving one or more first media sources from one or more first devices of a first user;
receiving one or more second media sources from one or more second devices of a second user;
determining, for the one or more first devices, one or more first settings for synchronizing a first output of the one or more second media sources at the one or more first devices;
transmitting, to the one or more first devices, the one or more first settings and the one or more second media sources;
determining, for the one or more second devices, one or more second settings for synchronizing a second output of the one or more first media sources at the one or more second devices;
transmitting, to the one or more second devices, the one or more second settings and the one or more first media sources;
receiving an input from the one or more first devices associated with altering an output of the one or more second media sources, the input representing a setting that synchronizes the one or more second media sources, the input being based on input received, via the one or more first devices, from the first user; and
transmitting, to the one or more second devices, an indication associated with the first user altering the output of the one or more second media sources.

14. The system of claim 13, wherein the setting comprises a first setting, the acts further comprising causing presentation of at least one of:
a first graphical element on the one or more first devices, the first graphical element including a first icon associated with altering the first setting of the one or more second media sources; or
a second graphical element on the one or more second devices, the second graphical element including a second icon associated with altering a second setting of the one or more first media sources.

15. The system of claim 13, wherein the setting comprises a first setting and the input comprises a first input, the acts further comprising receiving a second input from the one or more second devices associated with outputting the one or more first media sources, the second input representing a second setting that synchronizes the one or more first media sources, the second input based on input received, via the one or more second devices, from the second user.

16. The system of claim 15, wherein the indication comprises a first indication, the acts further comprising transmitting at least one of:
a second indication to at least one of the one or more the first devices of the second setting;
or
a third indication to a third device of at least one of the first setting or the second setting.

17. The system of claim 15, the acts further comprising determining at least one of:
at least a third setting for the one or more first devices outputting the one or more second media sources, the third setting based at least in part on the first setting; or
at least a fourth setting for the one or more second devices outputting the one or more first media sources, the fourth setting based at least in part on the second setting.

18. The system of claim 13, wherein:
determining the one or more first settings is based at least in part on at least one of:
first capabilities of the one or more first devices; or
a first connection between the one or more first devices and the system; and
determining the one or more second settings is based at least in part on at least one of:
second capabilities of the one or more second devices; or
a second connection between the one or more second devices and the system.

19. The system of claim 13, the acts further comprising:
receiving one or more third media sources from one or more third devices;
determining, for the one or more first devices, one or more third settings for outputting the one or more third media sources, the one or more third settings associated with synchronizing a third output of the one or more third media sources;

transmitting, to the one or more first devices, the one or more third media sources and the one or more third settings;

determining, for the one or more second devices, one or more fourth settings for outputting the one or more third media sources, the one or more fourth settings associated with synchronizing a fourth output of the one or more third media sources; and transmitting, to the one or more second devices, the one or more third media sources and the one or more fourth settings.

20. The system of claim 13, the acts further comprising determining, for the one or more second devices, one or more third settings for synchronizing a third output of the one or more second media sources at the one or more first devices, and wherein the indication comprises the one or more third settings for implementation by the second user.

* * * * *